United States Patent [19]

Clement et al.

[11] Patent Number: 5,095,076

[45] Date of Patent: Mar. 10, 1992

[54] PREPARATION OF HIGHLY SOLUBLE CONDUCTIVE POLYMER MATERIALS

[75] Inventors: Sandra K. Clement, Santa Clarita; Deanne P. Yamato, Van Nuys; Randy E. Cameron, Calabasas Hills, all of Calif.

[73] Assignee: Lockheed Corporation, Calabasas, Calif.

[21] Appl. No.: 608,765

[22] Filed: Nov. 5, 1990

[51] Int. Cl.$^5$ .............................................. C08L 77/06
[52] U.S. Cl. .................... 525/435; 525/436; 525/527; 525/528; 525/540; 525/509; 525/928; 525/524; 525/420; 528/422; 528/397; 528/81; 528/157; 528/158; 528/159
[58] Field of Search .............. 525/435, 436, 527, 528, 525/540, 509, 928, 524, 420; 528/422, 397, 81, 157, 158, 159

[56] References Cited

U.S. PATENT DOCUMENTS

| | | | |
|---|---|---|---|
| 4,798,685 | 1/1989 | Yaniger | 528/397 |
| 4,806,271 | 2/1989 | Yaniger et al. | 528/422 |
| 4,851,487 | 7/1989 | Yaniger et al. | 528/422 |
| 4,855,361 | 8/1989 | Yaniger et al. | 525/436 |
| 4,935,163 | 6/1990 | Cameron | 528/422 |
| 4,940,640 | 9/1991 | MacBiarmid | 528/422 |
| 4,983,690 | 1/1991 | Cameron et al. | 525/436 |
| 5,008,041 | 4/1991 | Cameron et al. | 528/422 |

FOREIGN PATENT DOCUMENTS

| | | | |
|---|---|---|---|
| 49002 | 2/1990 | PCT Int'l Appl. | 528/422 |
| 49008 | 8/1990 | PCT Int'l Appl. | 528/422 |
| 49011 | 11/1990 | PCT Int'l Appl. | 525/420 |

*Primary Examiner*—Kriellion S. Morgan
*Assistant Examiner*—Olga Asinovsky

[57] ABSTRACT

Preparation of conductive polymers, particularly polyanilines having good solubility in organic solvents and high electrical conductivity, by providing a mixture of aniline, dianiline and a flexible diamine such as 1,3-bis(3-aminophenoxy)benzene or triethylene tetramine. The mixture is reacted in the presence of an oxidant such as ammonium persulfate and a protonic (Bronsted) acid, e.g. tosic acid, to polymerize the mixture and form a conductive polyaniline in which the conjugation is interrupted by an intermediate diamine group, and which renders the resulting polymer more flexible than polyaniline per se. The conductive polymer so produced also has terminal primary amino groups which aid solubility and which are further reactive. The conductive polyaniline product of the invention can be blended with non-conductive resins such as polyimides to provide cured conductive resin blends having good mechanical properties.

20 Claims, No Drawings

PREPARATION OF HIGHLY SOLUBLE CONDUCTIVE POLYMER MATERIALS

BACKGROUND OF THE INVENTION

This invention relates to the production of electrically conductive polymers and is particularly concerned with the preparation of conductive polyaniline materials, particularly polyaniline materials, having high solubility in organic solvents, in combination with high conductivity.

Electrically conductive polyaniline is generally synthesized via the oxidative polymerization of aniline under aqueous acidic conditions.

Aniline is much more difficult to oxidize than the polyaniline oligomers. Consequently, the slow or rate-determining step of the reaction is the oxidation of aniline. The polyaniline product of such reaction generally contains a large percentage of polymer of very high molecular weight. However, this same product also contains some material having a relatively low molecular weight, e.g. of the order of 2,000. Unfortunately, the high molecular weight polymers are sparingly soluble in organic solvents such as N-methyl pyrrolidone (NMP), and only the low molecular weight material is soluble in organic solvents. However, the solubility of the polymers is inversely proportional to the conductivity, so that as the solubility is increased, the electrical conductivity of the polyaniline product decreases.

The solubility of high molecular weight conductive polyaniline in organic solvents has been increased by attaching specific derivatizing agents such as anhydrides to the polymer backbone. This has been described in U.S. Pat. No. 4,851,487 to S. I. Yaniger and Randy E. Cameron, and assigned to the same assignee as the present application. U.S. Pat. No. 4,855,361 to S. I. Yaniger and Randy E. Cameron, 4 and assigned to the same assignee as the present application, describes the blending of such soluble conductive polymers with polyimide resins.

The utility of conductive polymers such as conductive polyaniline is optimized when the material is highly soluble in organic solvents. This solubility allows for easy blending of the polymer with other resins such as polyimides as described in above U.S. Pat. No. 4,855,361.

U.S. patent application Ser. No. 471,979, filed Jan. 30, 1990, by R. E. Cameron and S. K. Clement, and assigned to the same assignee as the present application, discloses the preparation of controlled molecular weight conductive polyaniline having solubility in organic solvents by providing a mixture of aniline and dianiline in predetermined proportions, and reacting such mixture in the presence of a suitable oxidant such as ammonium persulfate, and a protonic acid such as tosic acid, to polymerize the mixture of aniline and dianiline. However, the resulting conductive polyaniline material still often has insufficient solubility in organic solvents such as N-methylpyrrolidone to afford optimum processibility.

An object of the present invention accordingly is the preparation of conductive polymer materials, particularly conductive polyaniline materials, having improved solubility in organic solvents and improved processibility.

Another object is the provision of conductive polymers such as conductive polyaniline having high solubility in organic solvents, in combination with high conductivity.

A still further object is the preparation of conductive polyaniline materials having the aforementioned characteristics, and also having further reactivity.

Still another object is the preparation of conductive polyaniline materials having good solubility, high conductivity and reactivity, and possessing good mechanical properties.

Yet another object is to provide novel procedure for the preparation of conductive polymers, particularly conductive polyaniline materials, having the above noted properties.

SUMMARY OF THE INVENTION

It is known that conductivity in conductive polymers such as conductive polyaniline is provided by conjugation throughout the backbone of the polymer, but such conjugation tends toward production of hard and brittle molecules and also toward reduction in solubility.

According to the present invention, such conjugation is interrupted and a conductive polyaniline is produced having good solubility and some additional flexibility, together with enhanced conductivity, by polymerizing polyaniline off of a flexible diamine, as further defined hereinafter.

Thus, aniline and dianiline, together with a flexible diamine such as 1,3-bis(3-aminophenoxy)benzene (APB), are reacted in an acid solution in the presence of a suitable oxidant such as ammonium persulfate, and a conductive polyaniline material is produced having high solubility in organic solvents. The polymer product contains a flexibilizing diamine group essentially in the center of the molecule, which is connected at both ends to a polyaniline group. The polymer also contains terminal primary amine groups at both ends of the molecule. The presence of the intermediate flexible group in the conductive polyaniline molecule tends to interrupt the conjugation in the conductive polyaniline and to increase solubility of the polymer while somewhat increasing the flexibility thereof.

The solubility of the polymer of the present invention can be increased by nearly one order of magnitude compared with the materials made previously. The degree of solubility in various solvents can be controlled by the selection of the diamine. Thus, it is possible to produce conductive polyanilines that are soluble in a wider variety of solvents, and consequently, blendable with a wider variety of resin systems than previously possible.

It has also been found unexpectedly that the resulting soluble polyanilion material of the invention containing an intermediate flexible diamine group has substantially improved conductivity, rather than the expected conductivity decrease in low molecular weight soluble conductive polyaniline heretofore produced. In polymerization reactions for producing polyaniline according to present practice, since the conductivity of the polymer decreases as the molecular weight decreases because the conjugation length of the polymer decreases, the soluble low molecular weight polymers are the least conductive. This contrasts with the polymer materials of the present invention, which can have very high molecular weight, with maximum conjugation length, yet can be highly soluble because of the presence of a flexible diamine segment.

Further, the presence of terminal primary amine groups on the polyaniline material produced according to the invention permits increased reactivity of this material with other components.

Thus, for example, using APB as the flexible diamine, the reaction can be represented below:

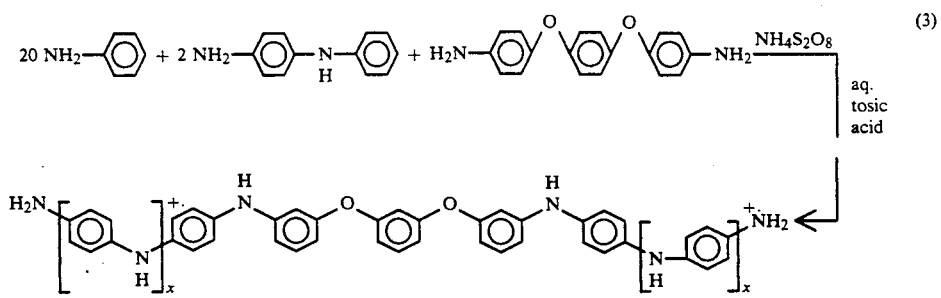

(3)

DETAILED DESCRIPTION OF THE INVENTION AND PREFERRED EMBODIMENTS

The conductive polymers or conductive polyaniline products of the invention can be represented by the following general formula:

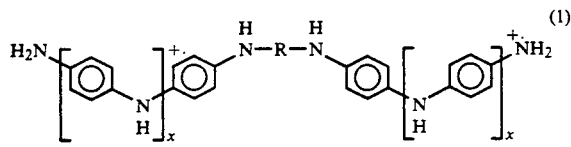

(1)

where R is any organic group or unit in the form of a flexible segment derived from an organic diamine, and that is more flexible than polyaniline itself and that interrupts the conjugation of the adjacent polyaniline groups, and renders the resulting polymer more flexible than polyaniline itself. Thus, R can be an aromatic group or an aliphatic group, and which can be unsubstituted or substituted, e.g. with amino groups, oxygen-containing groups, halogen groups, e.g. Cl, Br and the like, or aryl, e.g. phenyl, or alkyl substituents containing from 1 to about 20 carbon atoms, e.g. methyl, ethyl, and the like; and x ranges from about 8 to about 200.

The R group is derived from aromatic and aliphatic diamines and representative examples of R include bis(-phenoxy)benzene, methylene diphenyl, dodecane, ethyleneimine and oxydiphenyl.

Accordingly, the conductive polymers of the invention, as represented by formula (1) above, can be prepared by providing a mixture of aniline, dianiline and a flexible diamine of the formula $$H_2N-R-NH_2 \qquad (2)$$

where R has the values noted above. The flexible diamine additive can thus contain any aromatic or aliphatic group, has two reactive primary amine functions, and is soluble in aqueous acid. Preferably, R is a relatively large aromatic or aliphatic group containing at least 4 carbon atoms, e.g. about 4 to about 20 carbon atoms. Examples of flexible diamine additives include, 1,3-bis(3-aminophenoxy) benzene(APB), methylene dianiline, oxydianiline, 2,2'-bis[(4-aminophenoxy)-4 phenyl] hexafluoro propane (4BDAF), 1,12 diamino dodecane, and ethyleneimines such as diethylene triamine and triethylene tetramine. A preferred diamine is triethylene tetramine.

The mixture of aniline, dianiline and flexible diamine is reacted in the presence of an oxidant and a protonic (Bronsted) acid to polymerize the mixture and form the flexibilized conductive polyaniline of formula (1) above.

In the above reaction it is noted that the oxidant employed is ammonium persulfate and the protonic acid is tosic (tosylic) acid.

The molar proportions of aniline, dianiline and flexible diamine employed in the reaction mixture range from about 8 to about 9.5 mols of aniline, about 0.5 to about 2.0 mols of dianiline and about 0.1 to about 0.3 mol of flexible diamine. When employing the reactants in the above ranges, the resulting conductive polymers or polyanilines have an average molecular weight ranging from about 8,000 to about 40,000, as measured by GPC (gel permeation chromatography) versus polystyrene. In the process of the present invention strong, mild or weak oxidants can be employed. Thus, while strong oxidants such as ammonium persulfate can be employed to catalyze the oxidative polymerization of aniline according to the invention, mild oxidants such as benzoperoxide, or weak oxidants such as o-chloranil, p-chloranil and cupric chloride can also be successfully employed in the invention procedure to obtain conductive polyaniline having improved solubility and conductivity according to the invention. The proportion of oxidant employed in the polymerization reaction can range from about 0.5 to about 1.0 mol per mol of both the aniline and dianiline in the initial reaction mixture.

A protonic acid is also employed in conjunction with the oxidant, to function as dopant for producing the conductive polyaniline product. There are two roles of the acid in the polymerization reaction. The first role is to produce a conductive polyaniline. The second is that during the synthesis, the acid is required to provide a highly ionically active solution for high purity conductive polyaniline material to be formed. Thus, an excess of a strong acid is required to provide the high acidity corresponding to a pH below pH=1 and high ion content required in the reaction.

Accordingly, for this purpose, protonic (Bronsted) acids are employed such as hydrochloric acid, sulfuric acid, formic acid, tosic acid and aromatic multisulfonic acids such as benzene disulfonic acid. However, the use of tosic acid or benzene disulfonic acid is preferred in providing both a thermally stable conductive polyaniline as well as a soluble polymer.

The proportion of protonic acid employed can range from about 2.0 to about 3.0 mols per mol of both the aniline and dianiline in the initial reaction mixture.

The reaction is generally carried out in aqueous medium. If desired, although not essential, a solvent such as acetic acid or formic acid can be employed to dissolve the dianiline and flexible diamine in the initial reaction mixture.

There is no need for temperature control of the polymerization reaction according to the invention, since there is only very mild warming of the reaction mixture. This contrasts with the much higher temperatures conventionally utilized in the oxidative polymerization of aniline heretofore carried out, in order to initiate and effect a much more complex polymerization reaction.

In carrying out the reaction illustrated by the reaction scheme (3) above, all of the three reactants, aniline, dianiline and flexible diamine can be placed in solution in predetermined proportions as noted above. An appropriate amount of oxidant such as ammonium persulfate is added to an aqueous, e.g. one molar, protonic acid, such as tosic acid, solution. Such solution is slowly added to the amine mixture, e.g. at an approximate rate of one liter per hour. If desired, one fourth molar equivalent of a reducing agent such as sodium sulfite, can be added to quench the reaction and avoid oxidative decomposition of the product. After completion of the reaction, the mixture is filtered and the resulting solids are thoroughly washed, e.g. with aqueous acid, water and acetone, then quickly dried. Flexible conductive polyanilines as represented by formula (1) above are obtained, and are found to be highly soluble in organic solvents such as NMP(N-methylpyrrolidone) and formic acid. The solubility in NMP of the conductive form of polyaniline produced according to the invention is between 6 and 11 grams per liter, whereas the best previous solubility of a conductive polyaniline was not higher than 6 grams/liter in NMP. The products of the invention have a conductivity up to 17 S/cm, e.g. about 7-17 S/cm, much higher than in the case of polyaniline as previously produced, having a conductivity not greater than about 10 S/cm. The conductive polyaniline yield produced according to the present invention ranges from about 50 to about 80% conversion of aniline.

It is seen from formula (1) of the polyaniline product of the invention that the conjugation of the polyaniline groups is interrupted by the intermediate diamine or —NH—R—NH— group provided by the flexible diamine. The R segment in the intermediate flexible or flexibilizing diamine groups, such as the APB group as illustrated in reaction scheme (3) above, have little conjugation and constitute flexible groups, rendering the resulting polyaniline product less hard and less brittle than the completely conjugated conductive polyaniline products of the prior art.

Only a small amount of the flexible diamine additive is used because long segments of conjugated polyaniline are needed on opposite sides of the —NH—R—NH— group to produce a conductive material. In this respect it is noted that the products of the invention are not copolymers. If too much diamine additive is used, the polyaniline segments may be very short and the conductivity very low. The specific properties of the polymer products depend on the nature and amount of the diamine additive used.

Thus, for example, where the diamine additive is an ethyleneimine such as triethylenetetramine, the polyaniline chains growing from both ends of the secondary amine functions of such diamine, align such that a platelet morphology is produced.

Another advantage of the conductive polymer or polyaniline products of the invention, as illustrated in formula (1) above is that the polymer is terminated at both ends with primary amine —NH$_2$ groups. Thus, the conductive polyaniline product of the invention has a flexible or flexibilizing group in the middle of the molecule and the primary amine group at opposite ends of the molecule further aids the solubility of the product. Also, such terminal primary amine groups provide reactivity with other material such as a polyimide. On the other hand, conventional conductive polyaniline is terminated at one end by a phenyl group and at the other end by secondary amino groups, which are significantly less reactive than the primary amino groups on the polyaniline product of the present invention.

The conductive polyaniline product formed by the above reaction can be deprotonated by ammonium hydroxide to form the polyaniline free base. This free base can then be derivatized, e.g. by reaction with an anhydride, as disclosed in above U.S. Pat. No. 4,851,487, or by reaction with an alkylating agent, such as methyl iodide as disclosed in U.S. Pat. No. 4,798,685 to Yaniger, assigned to the same assignee as the present application, or by reaction with an aromatic multisulfonic acid such as benzene disulfonic acid as disclosed in U.S. Pat. No. 4,935,163 to Randy E. Cameron, and also assigned to the same assignee as the present application, all of such disclosures being incorporated herein by reference.

The conductive polyaniline products produced according to the invention can be rendered even more soluble by converting the conductive polyaniline to the emeraldine polyaniline free base by deprotonating, e.g. with NH4OH, and derivatizing such polyaniline free base with an anhydride, an alkylating agent, or a multisulfonic acid, e.g. in the manner described in the above U.S. Pat. Nos. 4,851,487, 4,798,685, or 4,935,163.

In addition, if desired, the soluble conductive flexible polyaniline polymers produced according to the present invention can be blended with a variety of other suitable non-conductive resin systems, including structural and adhesive resins such as epoxies, maleimides, e.g. bismaleimide, polyimides, polyamides, polyethers and polythioethers. Such blending renders such resins conductive by doping with the conductive polyaniline polymers hereof, resulting in easily processable polymer blends. The soluble conductive polymers of the invention can be blended in a wide range of proportions with the above non-conductive resins to provide conductive polymer compositions or blends having improved flexibility, mechanical properties, including structural stability, and thermal stability, as compared to the conductive polymer or polyaniline material hereof per se. Generally, about 1 to about 99% of the conductive polymer hereof, to about 1 to about 99% non-conductive resin component, by weight of the mixture, can be employed. Particularly, to obtain higher conductivity, it is preferred to employ about 50 to about 99% conductive polymer to about 1 to about 50% non-conductive resin component by weight. Such blending can be carried out by mixing the conductive polymer hereof with non-conductive resin component in a suitable solvent such as N-methylpyrrolidone, and the like.

The following are examples of practice of the invention, it being understood that these examples are only illustrative and not limitative of the invention.

EXAMPLE 1

Four grams of N-phenyl-p-phenylenediamine (dianiline) are weighed and completely dissolved in 100 ml of either glacial acetic acid or formic acid. Two grams of the diamine additive 1,12, diamino dodecane and 34 grams of aniline are added to the solution for a total of 40 grams aniline+dianiline+diamine (1,12 diamino dodecane). 600 ml of 1 molar tosic acid are added to the mixture. In a separate container one fourth mole od ammonium persulfate is dissolved in 400 ml of 1 M tosic acid solution. The oxidant solution is slowly added at a rate of approximately 10 ml per minute to the solution containing the 40 grams of amine mixture.

After the mixture is allowed to stir for about 5 minutes a solution containing one sixteenth of a mole of sodium sulfite in water is added to the mixture. The mixture is stirred for about 10 minutes, then filtered. The solid filter cake is washed thoroughly with tosic acid, then water. The solid cake is mixed with 500 ml acetone, then filtered The acetone treatment is repeated until the filtrate is clear. The final product is dried thoroughly at low temperature (below 80° C.) in a vacuum or nitrogen purged oven. The dry product is weighed, ground to a powder, then pressed into a 1.125" diameter wafer. The bulk conductivity is measured by four point probe, and the solubility in NMP is determined. The yield calculated on the conversion of aniline to polymer is approximately 70–80%; the conductivity ranges from 6 to 17 S/cm; the solubility is up to 12 grams per liter in NMP.

EXAMPLE 2

4.6 grams of dianiline, 41.4 grams of aniline and 5.25 grams of methylene dianiline is dissolved in 100 ml of glacial acetic acid. The solution is diluted with 700 ml of one molar tosic acid. Ammonium persulfate is added to this mixture, and the procedure carried out as in Example 1. The conductivity of the product ranges up to 12 S/cm. It contains 15 to 25% soluble material and has a solubility of up to 11 grams per liter in NMP.

EXAMPLE 3

4.6 grams of dianiline, 41.4 grams of aniline and 2.7 grams of 1,3 bis(3 amino phenoxy)benzene (APB) is dissolved in 100 ml glacial acetic acid. The solution is diluted with 700 ml of 1 molar tosic acid. The oxidant is added to this mixture, and the procedure carried out as in Example 1. The conductivity of the product is between 8 and 12 S/cm; it has a solubility of about 4-5 grams per liter in N-methyl pyrrilidone (NMP).

EXAMPLE 4

6.9 grams of dianiline, 39.1 grams of aniline, and 10.05 grams of 2,2'-bis[(4-amino phenoxy)-4 phenyl] hexafluoro propane (4BDAF) is dissolved in 100 ml, 80% acetic acid. The solution is diluted with 700 ml of 1 molar toxic acid and the procedure carried out as in Example 1. The conductivity and solubility of the product are similar to Example 3.

EXAMPLE 5

6.9 grams of dianiline, 39.1 grams of aniline and 3 grams of triethylene tetramine are dissolved in 100 ml 80% acetic acid. The solution is diluted with 700 ml 1 molar tosic acid and the procedure carried out as in Example 1. The conductivity of the product is between 11 and 17 S/cm; and it has a solubility of 11 grams per liter in NMP.

EXAMPLE 6

6.9 grams of dianiline, 39.1 grams of aniline and 3 grams of oxydianiline are dissolved in 100 ml acetic acid. The solution is diluted with 700 ml of 1 molar tosic acid and the procedure carried out as in Example 1.

EXAMPLE 7

The conductive form of the flexible polyaniline material of Example 5 is mixed with NMP in a concentration of 0.25 to 0.30 g/ml to form a polyaniline slurry. this slurry is mixed with a resin solution containing 17% polyimide solids, marketed as Skybond, in ratios ranging from 0.5:1 to 4:1 polyaniline:polyimide solids by weight. The resultant liquid is spread on a surface and dried at 50° C. for several hours. The conductivity of the blend is 10 to 100 times lower than the original polyaniline.

EXAMPLE 8

The conductive form of the flexible polyaniline material of Example 5 is mixed with NMP as in Example 7. A bismaleimide material marketed as Matrimid 5295 Part A is stirred into the polyaniline mixture to attain a ratio between 0.5:1 and 4:1 polyaniline: bismaleimide by weight. The resulting mixture is dripped into a large amount (1 to 2 liters) of a solvent such as a hexane/toluene mixture to coprecipitate the blend. The solvent is filtered, and the filter cake is rinsed with solvent until the filtrate is clear. The solid material is dried at 50° C. for several hours. The final conductivity of the material is 10 to 100 times lower than the original polyaniline material.

EXAMPLE 9

A small amount of the conductive polymer of Example 5 is converted to the free base form by mixing it with a 1 molar aqueous solution of ammonium hydroxide for about 15 minutes. The solution is filtered and the solid material is washed thoroughly with water and carefully dried at low temperature (below 80° C.) in a vacuum or nitrogen purged oven. A small amount of the free base equal to about 1-5% of the total polyaniline blends well with a polyimide marketed as Matrimid, in a proportion of 0.01:1 to 0.2:1. A solution of the conductive form of the same polyaniline is prepared and added to the polyimide +free base solution and treated as in Example 7. Premixing free base with the resin solution tends to prevent the phase separation which can occur when conductive polyaniline is blended with certain resin systems.

EXAMPLE 10

The conductive polymer of Example 5 is converted to the free base form as described in Example 9. A solution of the free base in NMP is prepared and added to a solution of polyimide as in Example 7. A solution of an appropriate derivitizing agent in the form of toluene sulfonic dianhydride, is prepared and added to the polyaniline-polyimide mixture. The mixture is dried as in Example 7. Blending with the free base material allows the use of a wider range of derivitizing agents such as polyacrylic acid, trimethyloxonium tetrafluoroborate, tosyl chloride, methyl tetrafluoroborate, ethyl tetrafluoroborate, trimethyl silyl chloride, and ethyl benzene sulfonate.

EXAMPLE 11

The polyaniline produced according to Example 5 is blended with solutions of epoxy resins using any of the methods described in Examples 7–9.

EXAMPLE 12

The soluble polyaniline of Example 5 can be blended with solutions of polythioethers such as Permapol P3 using 24 any of the methods described in Examples 7-9.

EXAMPLE 13

The soluble polyaniline of Example 5 can be blended with solutions of the material marketed as GANTREZ AN which is poly(methyl vinyl ether/maleic anhydride) using any of the methods described in Examples 7-9.

From the foregoing, it is seen that the invention provides a method for forming electrically conductive polymer or polyaniline products through the use of an initial reaction mixture containing aniline, dianiline and a flexible diamine, such products having enhanced solubility, conductivity and reactivity.

While particular embodiments of the invention have been described for purposes of illustration, it will be understood that various changes and modifications within the spirit of the invention can be made, and the invention is not to be taken as limited except by the scope of the appended claims.

What is claimed is:

1. A soluble conductive polyaniline having the formula

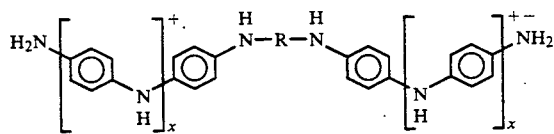

where R is an organic group in the form of a flexible segment derived from an organic diamine and that is more flexible than polyaniline itself, and which interrupts the conjugation of the adjacent polyaniline groups. and x ranges from about 8 to about 200.

2. The polymer of claim 1, wherein R is an aromatic group or an aliphatic group.

3. The polymer of claim 2, wherein R is selected from the class consisting of bis(phenoxy)benzene, methylene diphenyl, dodecane, ethyleneimine and oxydiphenyl groups.

4. The polymer of claim 3, wherein R is a bis(phenoxy) benzene group.

5. The polymer of claim 3, wherein R is a triethylene tetramine group.

6. A blend of (a) a conductive polyaniline as defined in claim 1 and (b) a suitable non-conductive resin, in a suitable solvent.

7. A blend of (a) a conductive polymer as defined in claim 2, and (b) a non-conductive resin selected from the group consisting of epoxies, maleimides, polyimides, polyamides, polyethers and polythioethers.

8. A blend of (a) a conductive polymer as defined in claim 3, and (b) a polyimide, in a suitable solvent.

9. A blend of (a) a conductive polymer as defined in claim 5, and (b) a polyimide, in a suitable solvent.

10. A cured blend of (a) a conductive polyaniline as defined in claim 1 and (b) a suitable non-conductive resin.

11. A cured blend of (a) a conductive polymer as defined in claim 2, and (b) a non-conductive resin selected from the group consisting of epoxies, maleimides, polyimides, polyamides, polyethers and polythioethers.

12. A cured blend of (a) a conductive polymer as defined in claim 3, and (b) a polyimide.

13. A process for producing a conductive polyaniline having good solubility and conductivity which comprises
   providing a mixture of aniline, dianiline and a flexible diamine,
   reacting said mixture in the presence of an oxidant and a protonic acid to polymerize said mixture, and
   forming a conductive polyaniline in which the conjugation is interrupted by an intermediate diamine group.

14. The process of claim 13, said reaction taking place in aqueous medium and employing the following molar proportions of the reactants
   about 8 to about 9.5 mols aniline
   about 0.5 to about 2.0 mols dianiline
   about 0.01 to about 0.03 mol flexible diamine 15. The process of claim 13, said flexible diamine being selected from the group consisting of 1,3-bis (3-aminophenoxy)benzene, oxydianiline, methylene dianiline, 2,2'-bis [(4-aminophenoxy)-4 phenyl] hexafluoro propane 1,12 diamino dodecane, diethylene triamine and triethylene tetramine.

16. The process of claim 13, said flexible diamine being 1,3-bis(3-aminophenoxy)benzene.

17. The process of claim 13, said flexible diamine being triethylene tetramine.

18. The process of claim 15, wherein said oxidant is ammonium persulfate.

19. The process of claim 15, wherein said oxidant is selected from the group consisting of benzoperoxide, o-chloranil, p-chloranil and cupric chloride.

20. The process of claim 12, wherein said protonic acid is selected from the group consisting of hydrochloric acid, sulfuric acid, formic acid, tosic acid and benzene disulfonic acid.

* * * * *